US010568786B1

(12) United States Patent
Nunn et al.

(10) Patent No.: US 10,568,786 B1
(45) Date of Patent: Feb. 25, 2020

(54) PIVOTAL HANDLE FOR FOLDING A RAMP OF A VEHICLE (71) Applicant: Creative Carriage Ltd., St. George (CA)

(72) Inventors: Robert Nunn, Cambridge (CA); Karanvir Singh Rana, Milton (CA)

(73) Assignee: Creative Carriage Ltd., St. George, Ontario (CA)

( * ) Notice: Subject to any disclaimer, the term of this patent is extended or adjusted under 35 U.S.C. 154(b) by 0 days.

(21) Appl. No.: 16/141,673

(22) Filed: Sep. 25, 2018

(51) Int. Cl.
*A61G 3/06* (2006.01)
*B60P 1/43* (2006.01)

(52) U.S. Cl.
CPC ............... *A61G 3/061* (2013.01); *B60P 1/43* (2013.01)

(58) Field of Classification Search
CPC ................................. B60P 1/43; A61G 3/061
See application file for complete search history.

(56) References Cited

U.S. PATENT DOCUMENTS

| 4,408,948 | A | * | 10/1983 | Robinson | B60P 1/4421 |
| | | | | | 187/243 |
| 4,664,584 | A | | 5/1987 | Braun et al. | |
| 4,718,812 | A | * | 1/1988 | Smalley | B60P 1/4442 |
| | | | | | 14/69.5 |
| 5,133,634 | A | * | 7/1992 | Gingrich | B60P 1/431 |
| | | | | | 14/71.1 |
| 5,261,779 | A | * | 11/1993 | Goodrich | B60P 1/4442 |
| | | | | | 414/546 |
| 6,039,528 | A | * | 3/2000 | Cohn | B60P 1/4457 |
| | | | | | 414/546 |
| 6,086,314 | A | * | 7/2000 | Savaria | A61G 3/06 |
| | | | | | 414/546 |
| 6,119,634 | A | | 9/2000 | Myrick | |
| 6,585,474 | B1 | * | 7/2003 | Kameda | A61G 3/06 |
| | | | | | 414/546 |
| 6,648,579 | B2 | | 11/2003 | Vartanian, Sr. | |
| 7,326,024 | B2 | * | 2/2008 | Cohn | B60P 1/4457 |
| | | | | | 414/546 |
| 7,413,395 | B2 | * | 8/2008 | Goodrich | A61G 3/06 |
| | | | | | 414/546 |
| 7,815,413 | B2 | * | 10/2010 | Fisher | A61G 3/062 |
| | | | | | 414/812 |
| 7,908,695 | B2 | * | 3/2011 | Budd | A61G 3/061 |
| | | | | | 14/71.3 |
| 8,156,595 | B2 | * | 4/2012 | Budd | A61G 3/061 |
| | | | | | 14/71.3 |
| 8,562,279 | B2 | * | 10/2013 | Beck | A61G 3/067 |
| | | | | | 414/546 |

(Continued)

FOREIGN PATENT DOCUMENTS

EP 1650077 A1 4/2006
GB 2414463 B 4/2007

(Continued)

*Primary Examiner* — Kaitlin S Joerger
(74) *Attorney, Agent, or Firm* — McKee, Voorhees & Sease, PLC (57) ABSTRACT A pivotal handle assembly is attached to a folding ramp to move the ramp from a raised transport position inside a vehicle to a lower, use position extending between the vehicle and the ground. The handle assembly extends upwardly in both the transport and the use positions, and allows an operator to fold and unfold the ramp assembly without bending down so as to minimize back strain.

20 Claims, 12 Drawing Sheets (56) References Cited

U.S. PATENT DOCUMENTS

| | | | | |
|---|---|---|---|---|
| D708,412 S | * | 7/2014 | Bruns | D34/33 |
| 9,375,369 B2 | * | 6/2016 | Bruns | A61G 3/062 |
| 9,597,240 B2 | * | 3/2017 | Hermanson | A61G 3/061 |
| 9,603,758 B1 | | 3/2017 | Perez et al. | |
| 9,814,635 B2 | * | 11/2017 | Bruns | A61G 3/062 |
| 2017/0216113 A1 | | 8/2017 | Kiser et al. | |
| 2017/0311718 A1 | * | 11/2017 | Benson | A47B 81/00 |
| 2019/0247248 A1 | * | 8/2019 | Perkins | A61G 3/061 |

FOREIGN PATENT DOCUMENTS

| | | |
|---|---|---|
| KR | 1859507 B1 | 5/2018 |
| WO | 2018104978 A1 | 6/2018 |

* cited by examiner

PIVOTAL HANDLE FOR FOLDING A RAMP OF A VEHICLE

BACKGROUND OF THE INVENTION

Various types of ramps are utilized to provide wheelchair accessibility to vehicles, such as vans and buses. Some ramps are deployed from the passenger side of the vehicle, while other ramps are deployed from the rear of the vehicle. A folding ramp is often utilized for rear vehicle entrance and exit, with the ramp having an upper or inner section pivotally mounted to opposite sides of the rear doorframe and a lower outer ramp section being hinged to the upper ramp section. The folding ramp moves between a raised, substantially vertical storage position just inside the rear door of the vehicle and a lowered, deployed use position sloping between the floor of the vehicle and the pavement or parking surface. This folding ramp typically has a small handle fixed on one side of the lower ramp section which can be grasped by the operator to move the ramp between the transport and use positions. However, this handle requires operator to bend down to lower and raise the outer ramp section to and from the ground. The ramp is relatively heavy, since it must support the weight of a person in a wheelchair. Therefore, moving the ramp between the transport and use positions by grasping the small handle adjacent the side of the outer ramp section may be difficult for some operators and cause risk of back injury or strain.

Therefore, there is a need for an improved folding ramp assembly for use with wheelchair assessable vehicles and other vehicles utilizing a ramp for moving cargo in and out of the vehicle.

Accordingly, a primary objective of the present invention is a provision of a pivoting handle for a folding ramp which allows the ramp to be folded and unfolded more easily and without risk of injury to the operator.

Another objective of the present invention a provision of a pivotal handle for folding vehicle ramp which allows an operator to move the ramp between transport and use positions without bending over or causing excessive strain on their back.

A further objective of the present invention is a provision of a pivotal handle which can be retrofit onto conventional folding ramps used in vehicles for rolling access to and from the vehicle.

Still another objective of the present invention is a provision of a method of folding and unfolding a ramp with inner and outer sections to and from a vehicle using an upstanding handle pivotally connected to the outer ramp section.

Yet another objective of the present invention is a provision of a pivotal handle for a folding vehicle ramp which is durable and safe in use, and economical to manufacture.

These and other objectives have become apparent from the following description of the invention.

SUMMARY OF THE INVENTION

A pivoted handle assembly is provided on a folding ramp of a vehicle to allow a wheelchair or other wheeled cart to be rolled into and out of the vehicle. The ramp includes an inner section and an outer section which are hinged together so as to be movable between a raised transport position and a lowered use position. In the transport position, the handle extends upright, substantially parallel with the ramp sections. To move the ramp from the transport position to a deployed position, the handle can be grasped and pivoted downwardly towards a horizontal position, and then pulled away from the vehicle so as to lower the ramp sections. As the ramp is lowered, the handle will pivot upwardly so that the outer ramp section can be easily lowered to the ground, without the operation bending over, or with minimal bending over of the operator.

The handle assembly includes a base mounted to the outer section of the ramp, and a bracket pivotally mounted to the base. A rigid handle is fixed to the bracket. Magnets may be used to retain the handle assembly in an upright orientation both when the ramp is folded and unfolded.

DETAILED DESCRIPTION OF THE DRAWINGS

A folding ramp 10 for use in a vehicle to provide wheelchair accessibility, or for use with other carts and dollies, includes an upper or inner section 12 and a lower or outer section 14. The upper and lower sections 12, 14 include a hinge 16 to allow the sections fold and unfolded relative to one another. Preferably, the ramp sections 12, 14 include upwardly extending lips or flanges 18 on the opposite sides to prevent a wheelchair, cart or dolly from accidentally rolling off the edge of the ramp 10.

Figure 1:
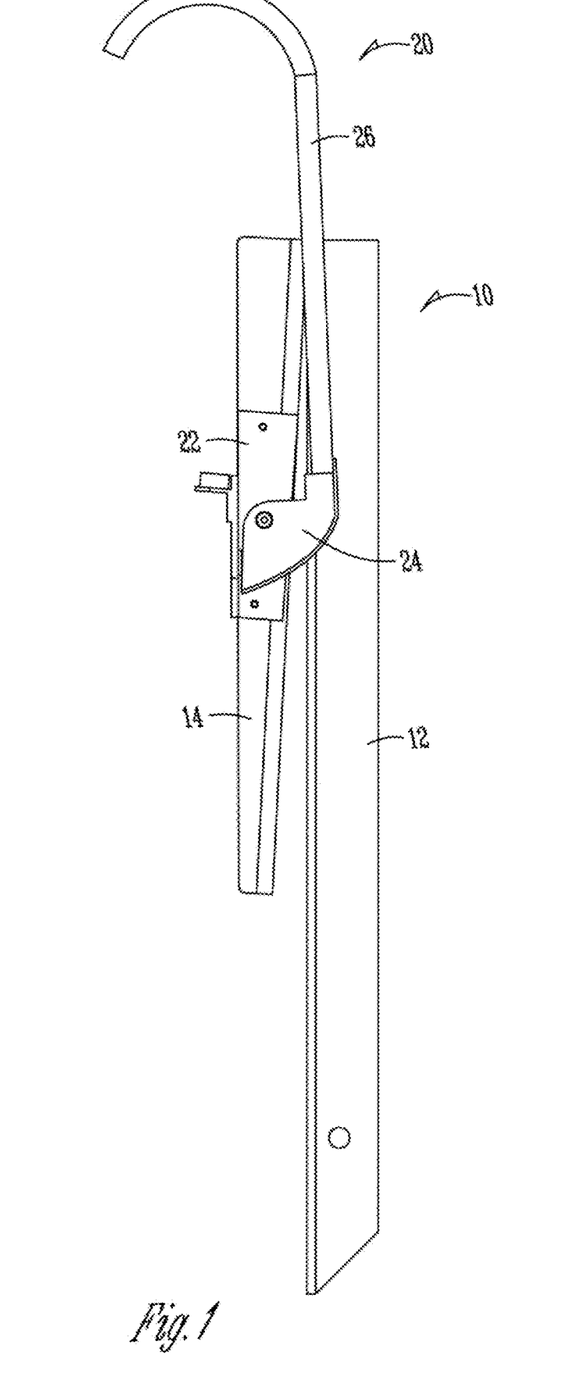
FIG. 1 is a side elevation view of a folding ramp of vehicle, with the pivotal handle assembly of the present invention mounted thereon.
Figure 3:
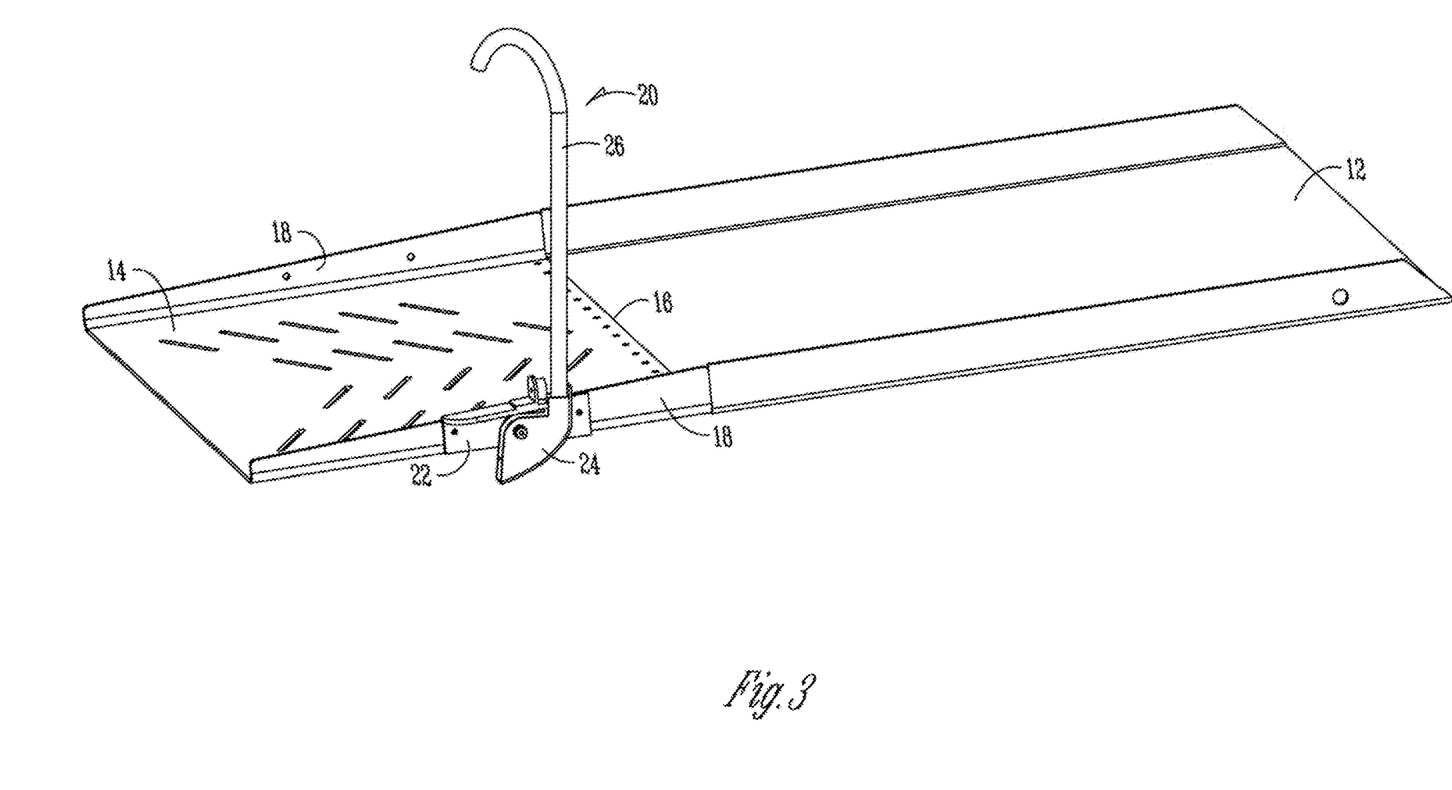
FIG. 3 is a perspective view of the ramp with the pivotal handle assembly of the present invention in the lowered, use position.
Figure 4A:
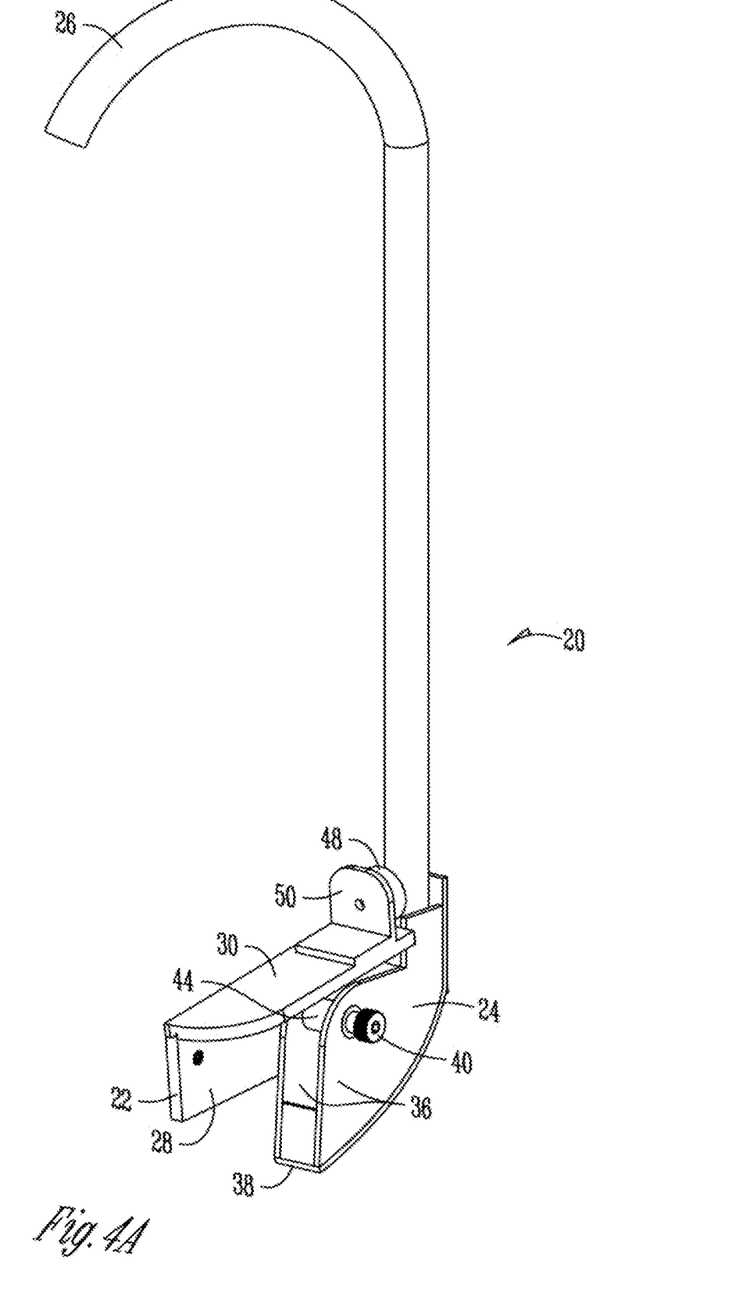
FIG. 4A is a perspective view of the handle assembly.
Figure 4B:
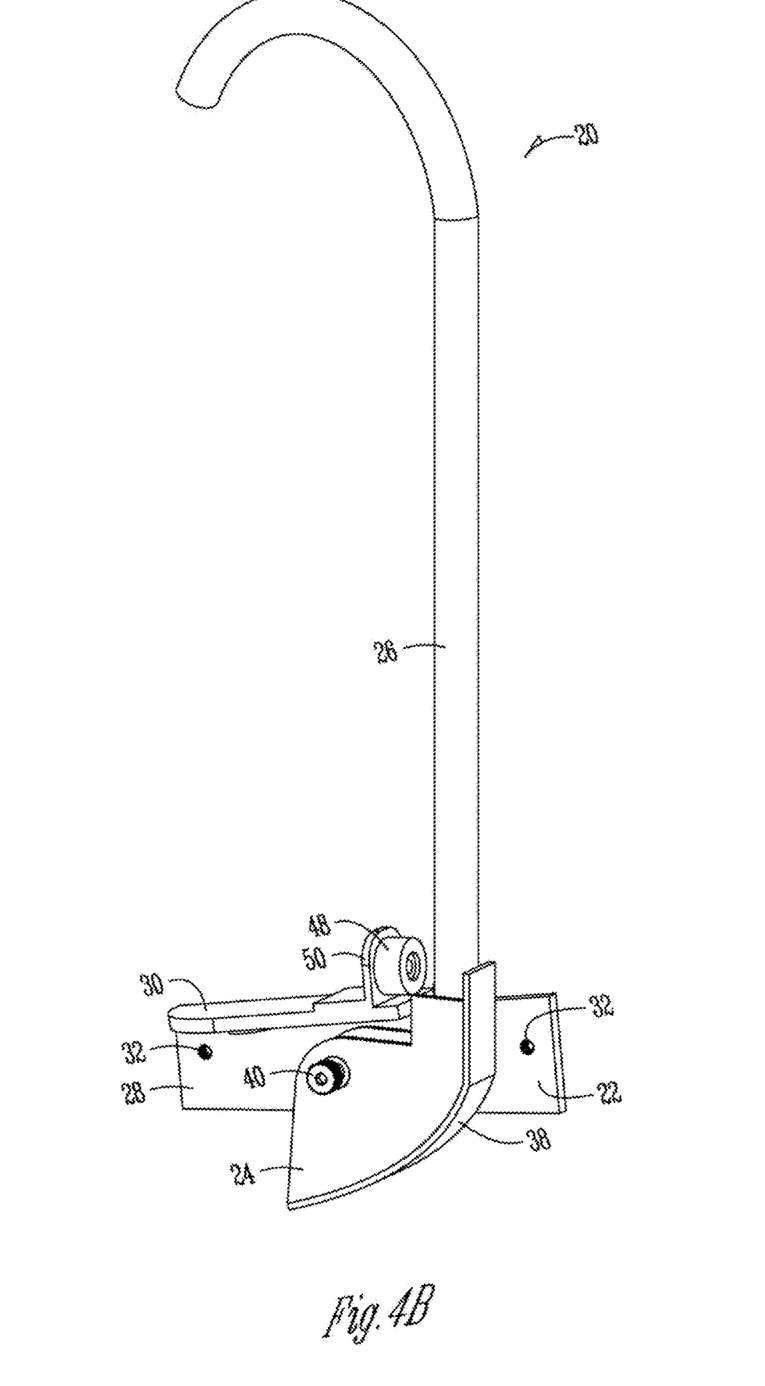
FIG. 4B is another perspective view of the handle assembly.
Figure 5:
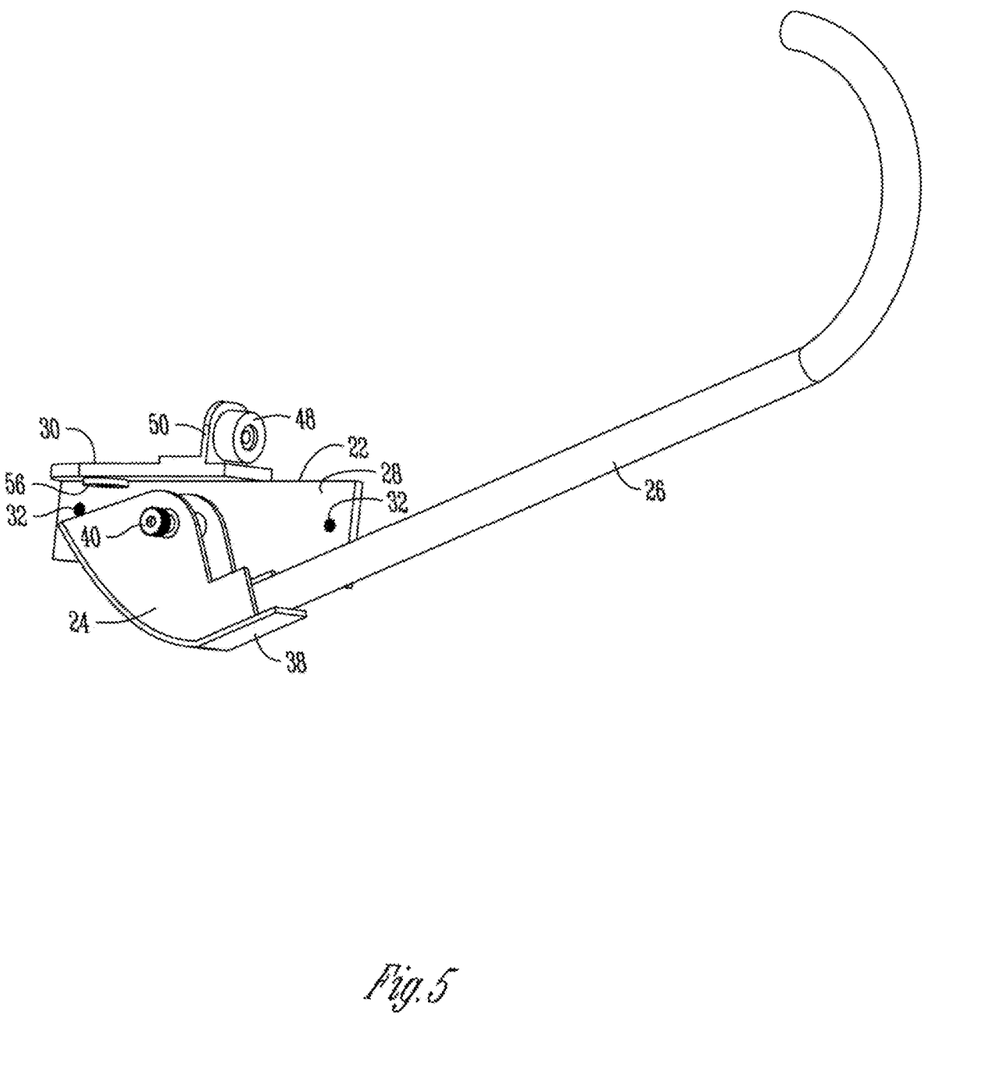
FIG. 5 is a perspective view of the handle assembly with the bracket and handle in an intermediate position on the base.
Figure 6:
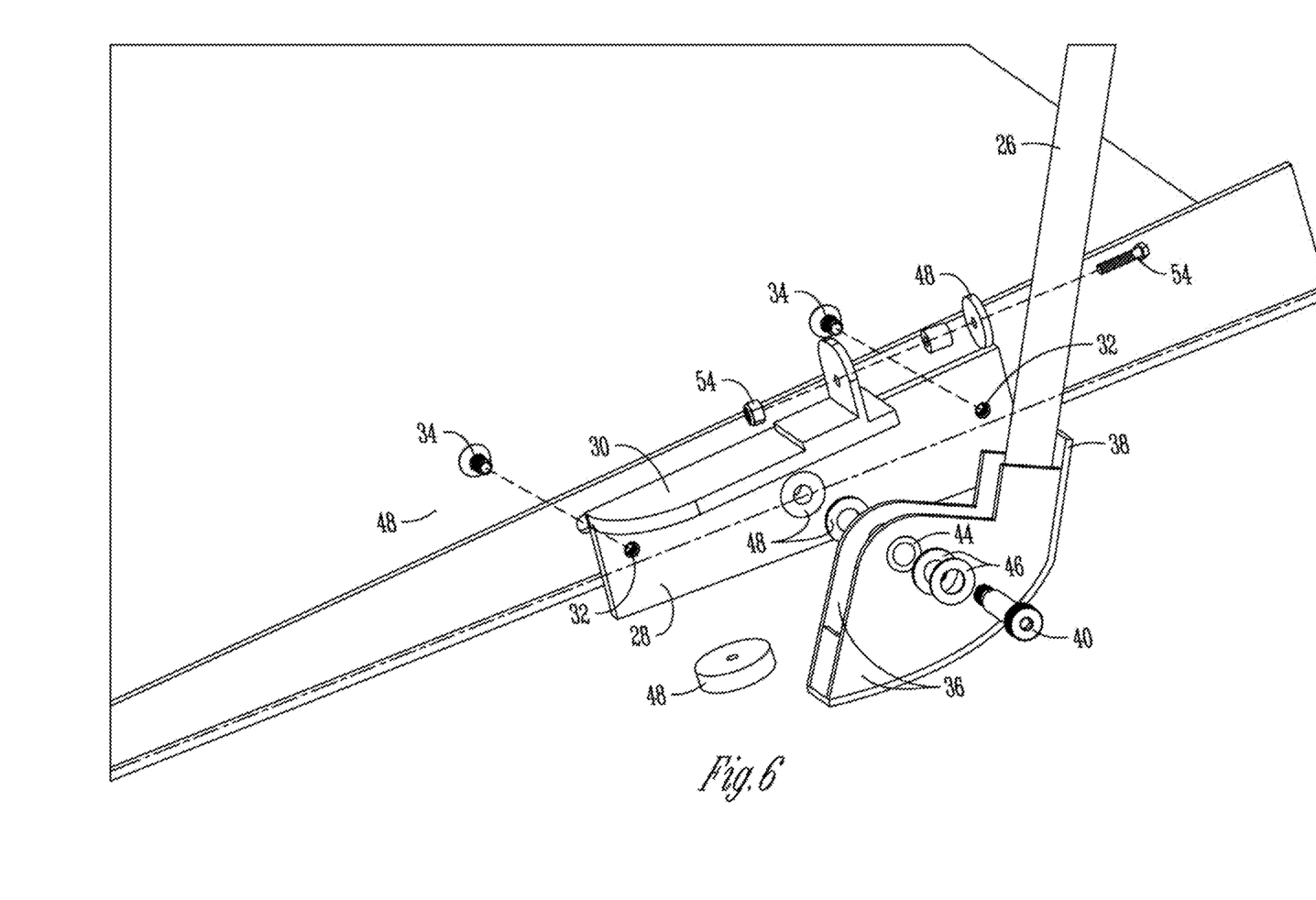
FIG. 6 is an exploded view of the pivotal handle assembly according of the present invention.

The ramp 10 commonly is mounted at the rear of the vehicle to allow access when the rear door is opened. The upper section 12 is pivotally mounted to the door frame for movement between a raised, transport position, wherein the ramp sections 12, 14 extend substantially vertically, as shown in FIG. 1, and a lowered, use position where in the outer end of the lower ramp section 14 rests upon the ground, pavement, or parking surface for the vehicle, as shown in FIG. 3.

The above description of the ramp 10 is conventional and does not constitute a part of the present invention.

The invention is directed towards a pivotal handle assembly 20 which is secured to the lower ramp section 14 to assist in the folding and unfolding of the ramp sections 12, 14 between the transport and use positions. More particularly, the handle assembly 20 includes three primary components: the base 22, the pivotal bracket 24, and the handle 26.

Figure 7:
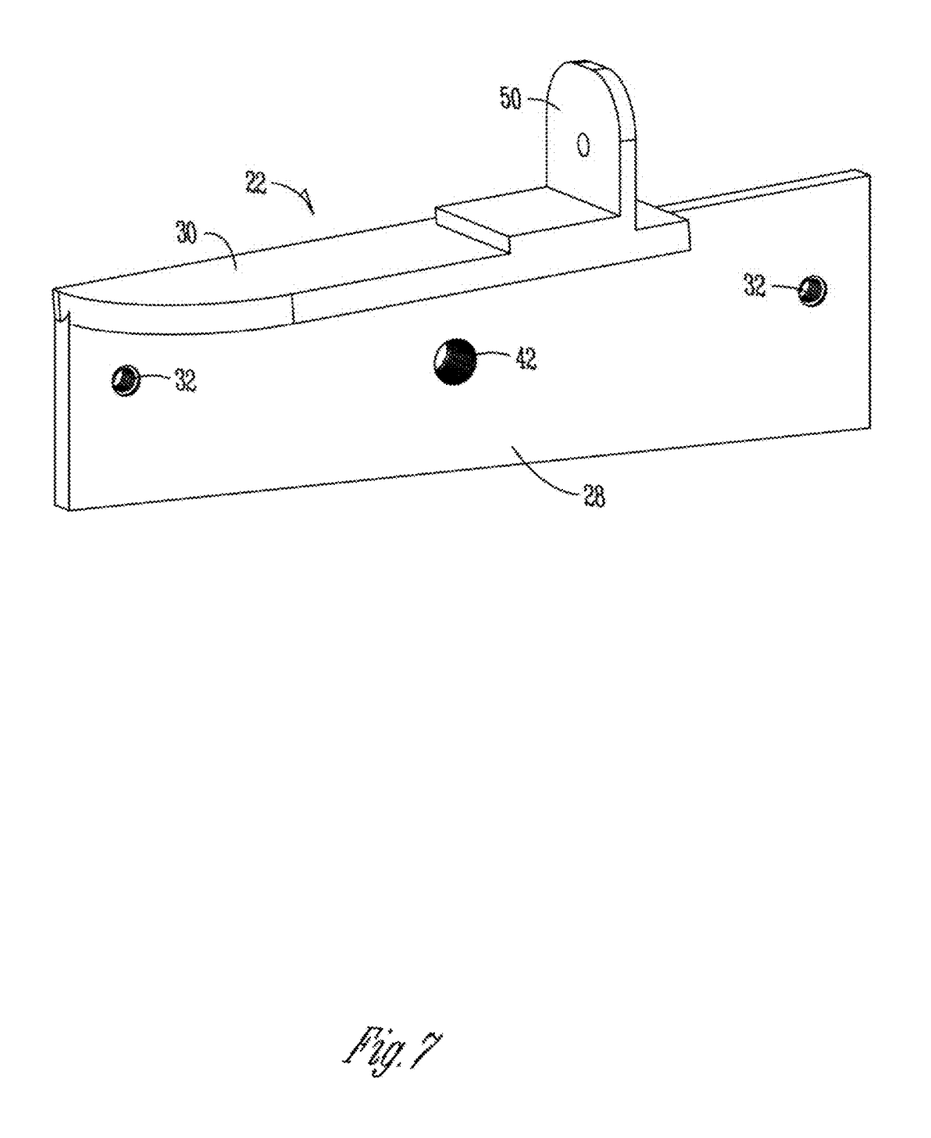
FIG. 7 is a perspective view of the base of the handle assembly.
Figure 8:
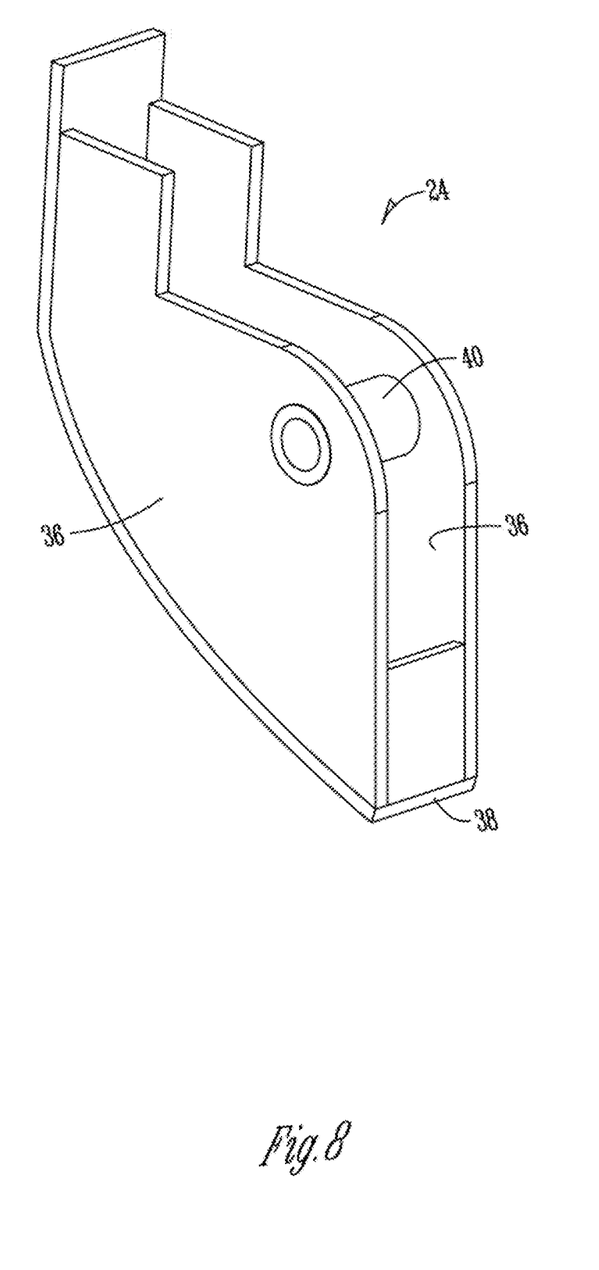
FIG. 8 is a perspective view of the bracket of the handle assembly.

Base 22 is shown in FIG. 7 and includes a first plate 28 and a second plate 30 welded or otherwise fastened to the first plate 28. The first plate 28 includes a pair of holes 32 near the ends of the plate adapted to receive bolts 32 or other fasteners for mounting the bracket 24 to the flanges or lips 18 on the lower ramp section 14. As seen in FIG. 7, in the preferred embodiment, the holes 32 are threaded so that the bolts 34 do not require nuts. Alternatively, the holes 32 may be unthreaded, and longer bolts can be used with a nut. It is understood that the plate 28 can also be secured to the flange 18 by other convenient means, such as welding, rivets, pins, or the like The bracket 24 includes a pair of side plates 36 and an end plate 38. The side plates 36 and end plate 38 can be formed as a single, integral piece, or can be separate pieces welded together. A bushing 40 extends through the side plates 36 to receive a pivot pin or bolt 40 which extends through the plates 36 and through a hole 42 in the base 22. Preferably, the hole 42 is threaded to receive a threaded end on the pin or bolt 40. Alternatively, the pin or bolt can extend through the base 22 and through the lippor flange 18 on the side of the lower ramp section 14 and secured by a nut (not shown). Preferably, nylon or metal washers 46 are provided on the pin 40 minimize friction.

Figure 9:
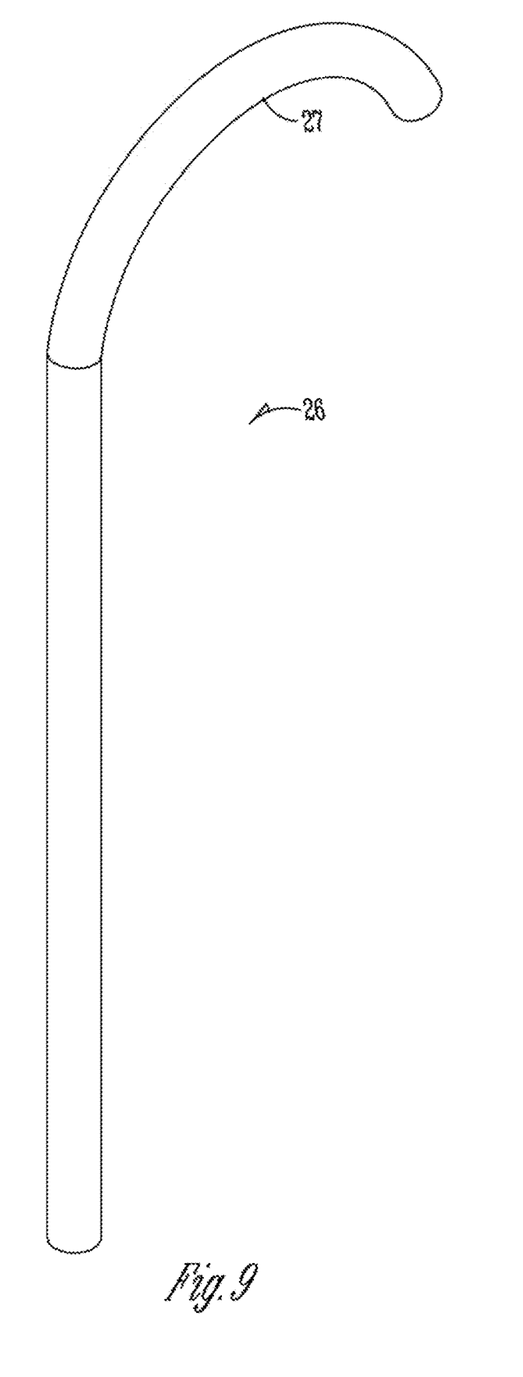
FIG. 9 is a perspective view of the handle of the handle assembly.
Figure 10:
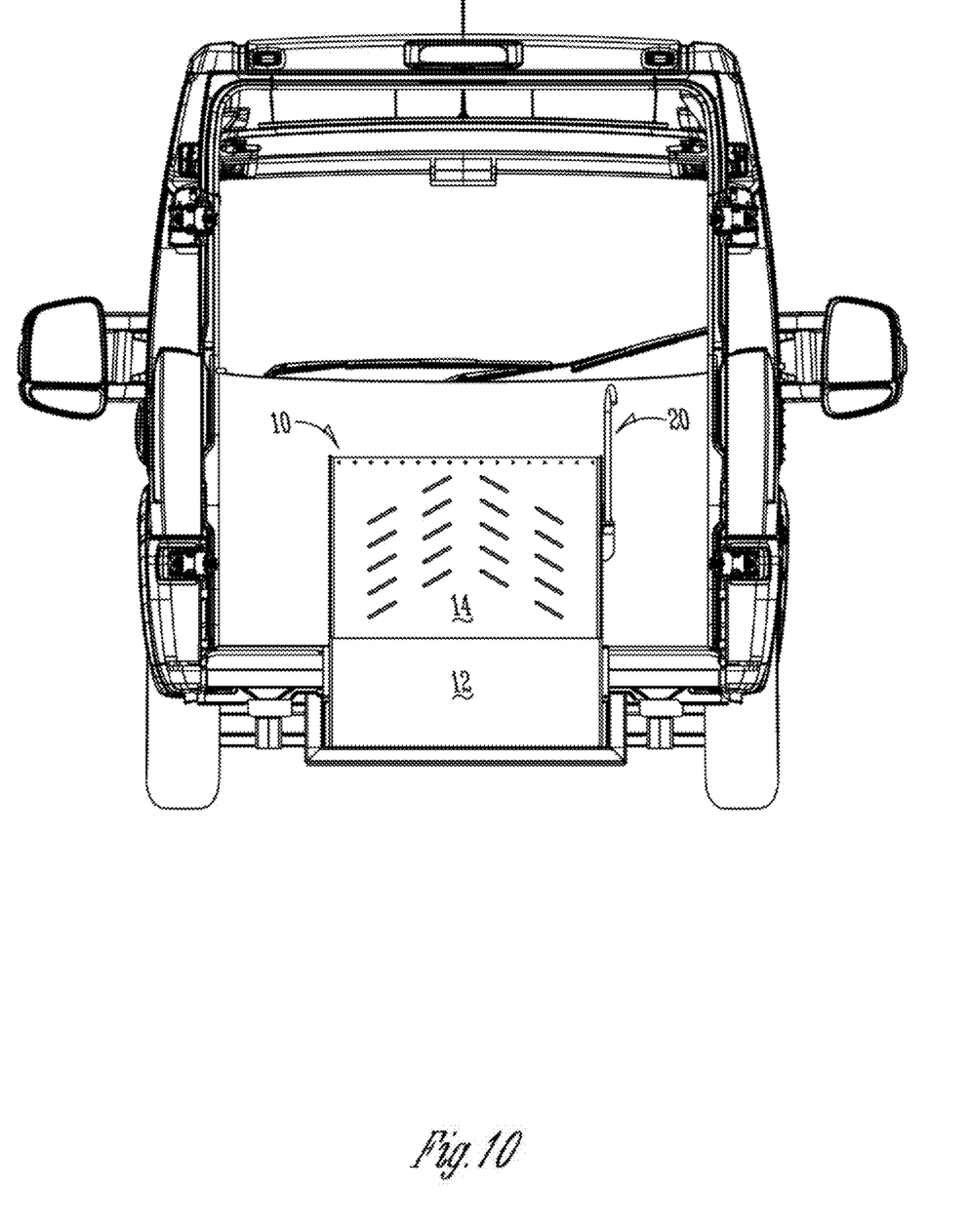
FIG. 10 is a rear elevation view of a van having the folding ramp and pivotal handle assembly in the raised, transport position, according to the present invention.
Figure 11:
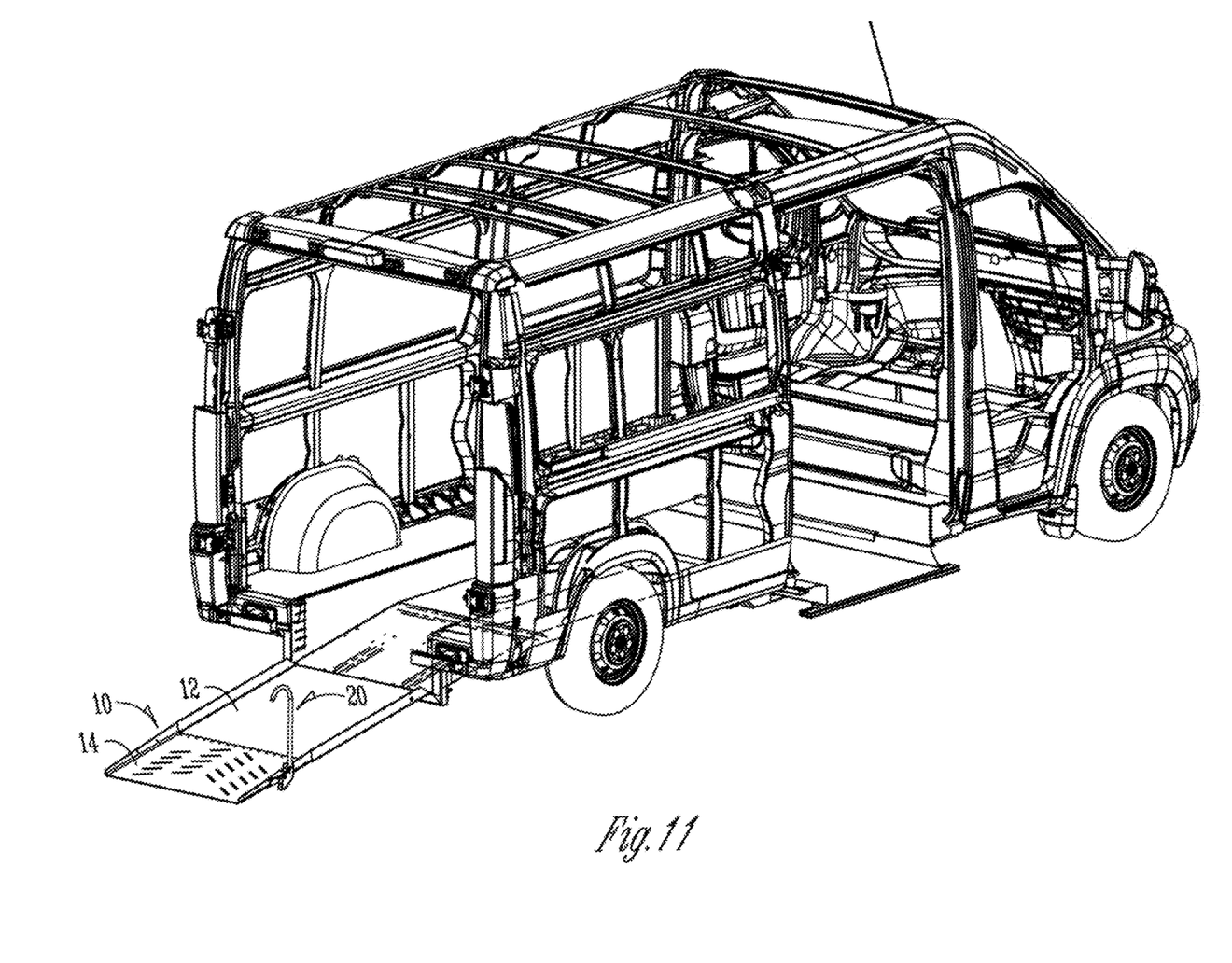
FIG. 11 is a perspective view of the van of FIG. 10, with the ramp in a lowered, use position.

The handle 26 includes a post fixed to the bracket 24 and a hand grip 27 at the top of the post. While the hand grip 27 is shown to be curved, it is understood that the hand grip can have any easy-to-grasp shape. The hand grip also can be pivotally connected to the post.

A first magnet 48 is mounted on an upstanding leg 50 of the base 22 in any convenient manner. For example, the magnet 48 can be mounted using a bolt 52 and nut 54. A second magnet 56 is mounted on the bottom of the second plate 30 of the base 22, using any convenient means, such as adhesive. The first magnet 48 holds the metal hand 26 in an upright orientation when the ramp 10 is deployed. The second magnet 56 magnetically secures the bracket 24 when the ramp 10 in the transport position. The magnets 48, 56 may engage the handle 26 and bracket 24, respectively for retention, or may be slightly spaced from the handle and bracket to prevent the magnets from breaking, while still maintaining a magnetic attraction to hold the handle or bracket in the desired position. The operator can easily overcome the force of the magnets 48, 56 by pulling on the handle 26.

Figure 2:
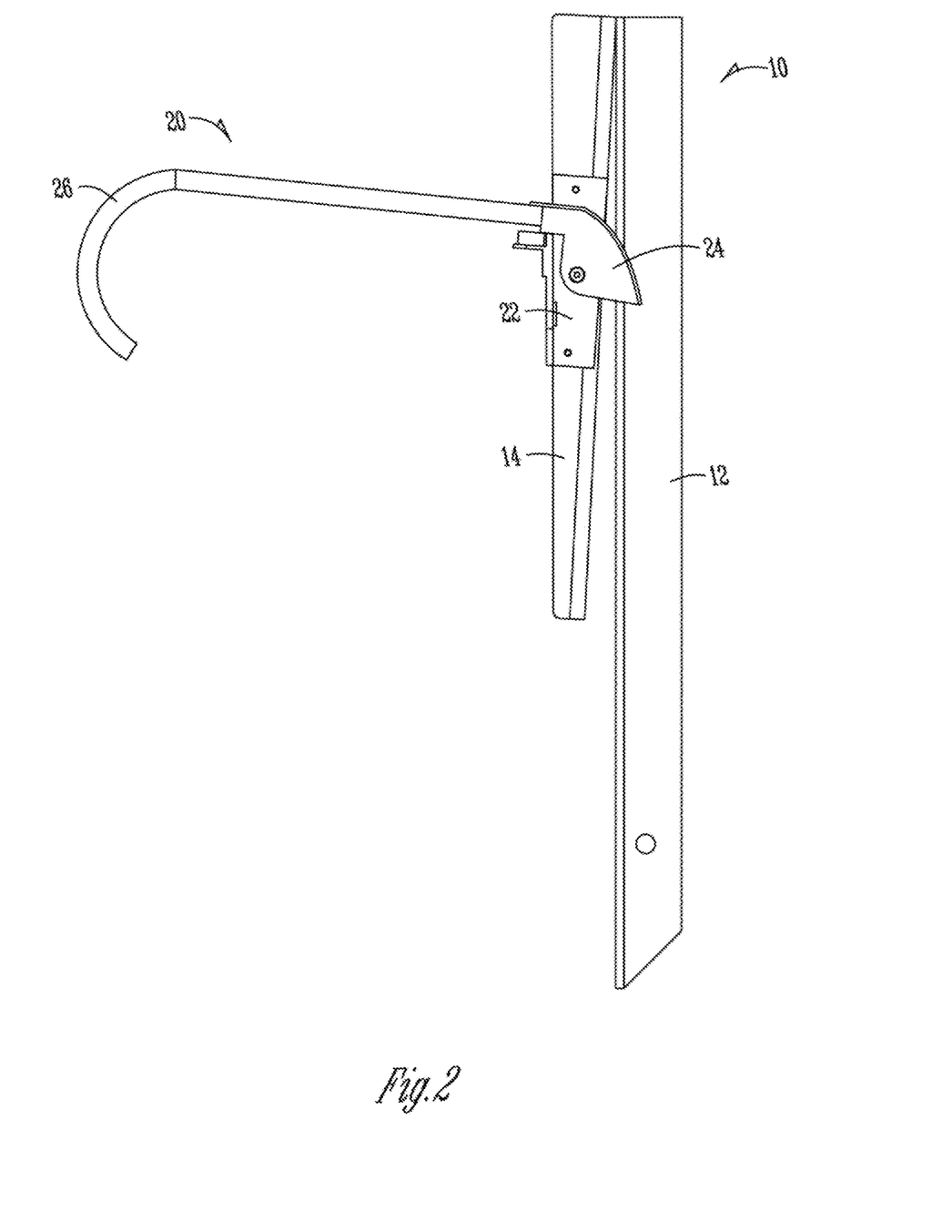
FIG. 2 is a view similar to FIG. 1, with the handle pivoted downwardly to begin deployment of the ramp from the transport position to the use position.

In use, the handle assembly 20 pivots from a first position substantially parallel with the ramps sections 12, 14 when the ramp 10 is folded in the transport position, as shown in FIG. 1, and a position substantially perpendicular to the ramp section 12, 14 when the ramp 10 is deployed, as shown in FIG. 3. When the ramp 10 is in the raised, storage position, the vertically oriented handle can be grasped by the operator and pulled downwardly and rearwardly, as shown in FIG. 2 so as to unfold the ramp 10 toward the lowered, used position. The plate 30 functions as a stop to limit the pivotal movement of the bracket 24 and handle assembly 26. To fold the ramp 10 up from the used position to the transport position, operator grasps the vertically oriented handle 26 and pulls upwardly and forwardly to pivot the upper and lower sections 12, 14 about the hinge 16 and the pivotal connection to the rear door frame of the vehicle. The length of the handle allows the operator to move the ramp 10 between the raised and lowered positions without bending over, and thereby eliminating excess stress on the operator's back. Thus, the ramp 10 and the handle assembly 20 provides for safer and easier movement of the ramp to and from the vehicle.

It is understood that the ramp 10 and handle assembly 20 can also be used in other locations of a vehicle, such as with a passenger side door of the vehicle, without departing from the scope of the present invention.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A handle assembly for a folding ramp of a vehicle, the ramp having inner and outer sections pivotal between a raised storage position inside a vehicle and a lowered use position extending outwardly from the vehicle, the handle assembly comprising:
   a base mounted to the outer section of the ramp;
   a bracket pivotally mounted to the base; and
   a rigid handle fixed to the bracket;
   whereby the handle extends upwardly when the ramp is in the storage and use positions, and the handle pivots when the ramp moves between the storage and use positions.

2. The handle assembly of claim 1 wherein the handle extends rearwardly from the inner section of the ramp during movement of the ramp between the storage and use positions.

3. The handle assembly of claim 1 wherein the handle moves to extend rearwardly during deployment of the ramp.

4. The handle assembly of claim 1 wherein the base is mounted on one side of the outer section of the ramp.

5. The handle assembly of claim 1 further comprising a magnet on the base to retain the handle upright when the ramp is in the use position.

6. The handle assembly of claim 1 further comprising a magnet on the base to retain the handle upright when the ramp is in the storage position.

7. The handle assembly of claim 1 further comprising first and second magnets in the base to magnetically hold the handle and prevent accidental pivotal movement of the handle.

8. The handle assembly of claim 1 wherein the handle includes a post with a lower end attached to the bracket and an upper end with a hand grip.

9. The handle assembly of claim 8 wherein the post is substantially parallel to the ramp outer section when the ramp is in the storage position and is substantially perpendicular to the ramp outer sections when the ramp is in the use position.

10. The handle assembly of claim 8 wherein the post and hand grip are non-pivotal relative to one another.

11. A folding ramp for a vehicle, comprising:
   an inner ramp section having a rear end pivotally connected to the vehicle;
   an outer ramp section having a rear end pivotally connected to a front end of the inner ramp section;
   a handle assembly with a lower end pivotally connected to the outer ramp section and an upper end with a hand grip; and
   wherein the hand grip is grasped by an operator to fold and unfold the ramp sections between storage and use positions.

12. The folding ramp of claim 11 wherein the handle assembly includes a base, a bracket, and a post, with the base secured to the outer ramp section, the bracket pivotally mounted on the base, and the post fixed to the bracket.

13. The folding ramp of claim 12 further comprising a magnet on the base to releasably hold the bracket against pivoting.

14. The folding ramp of claim 12 further comprising a pair of magnets on the base to releasably hold the bracket from pivoting when the ramp sections are in the storage and use positions.

15. The folding ramp of claim 12 wherein the post is substantially parallel to the ramp outer section when the ramp is in the storage position and is substantially perpendicular to the ramp outer section when the ramp is in the use position.

16. The folding ramp of claim 11 wherein the handle assembly pivots approximately 90°.

17. The folding ramp of claim 11 wherein the handle assembly has a stop plate to limit pivotal movement.

18. The folding ramp of claim 11 wherein the handle assembly moves between substantially vertical and horizontal orientations as the ramp sections fold and unfold.

19. A method of folding and unfolding a ramp with inner and outer sections to and from a vehicle, comprising:
   grasping an upstanding handle pivotally connected to the outer section;
   pulling the handle away from the vehicle when the ramp is folded to pivot the handle and unfold the ramp sections to a deployed position; and
   pulling the handle toward the vehicle when the ramp is deployed to pivot the handle and fold the ramp sections to a transport position.

20. The method of claim 19 wherein the handle is pulled through a radius of approximately 90° when folding and unfolding the ramp sections.

* * * * *